D. GAUL.
AUTOMOBILE STREET CLEANER.
APPLICATION FILED MAR. 11, 1912.
1,072,713.
Patented Sept. 9, 1913.
2 SHEETS—SHEET 2.
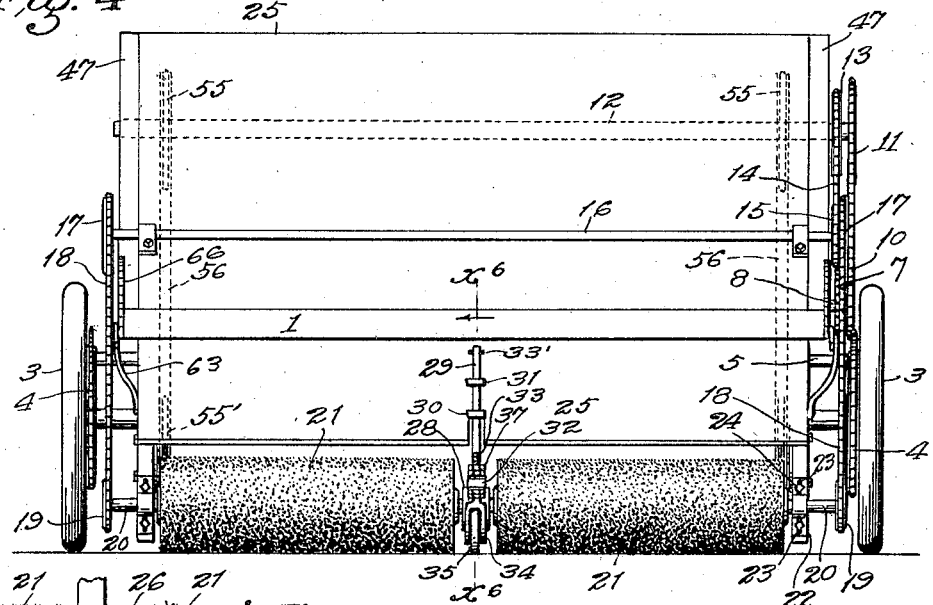
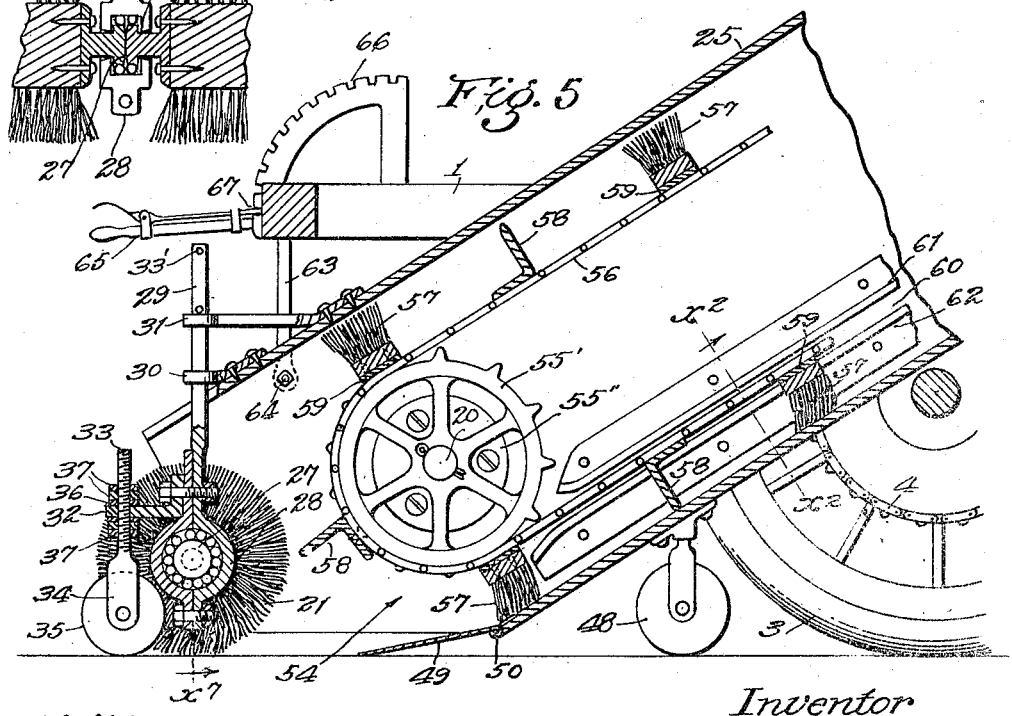
Witnesses
C. C. Holly
L. Belle Rice
Inventor
David Gaul
by James R. Townsend
his atty

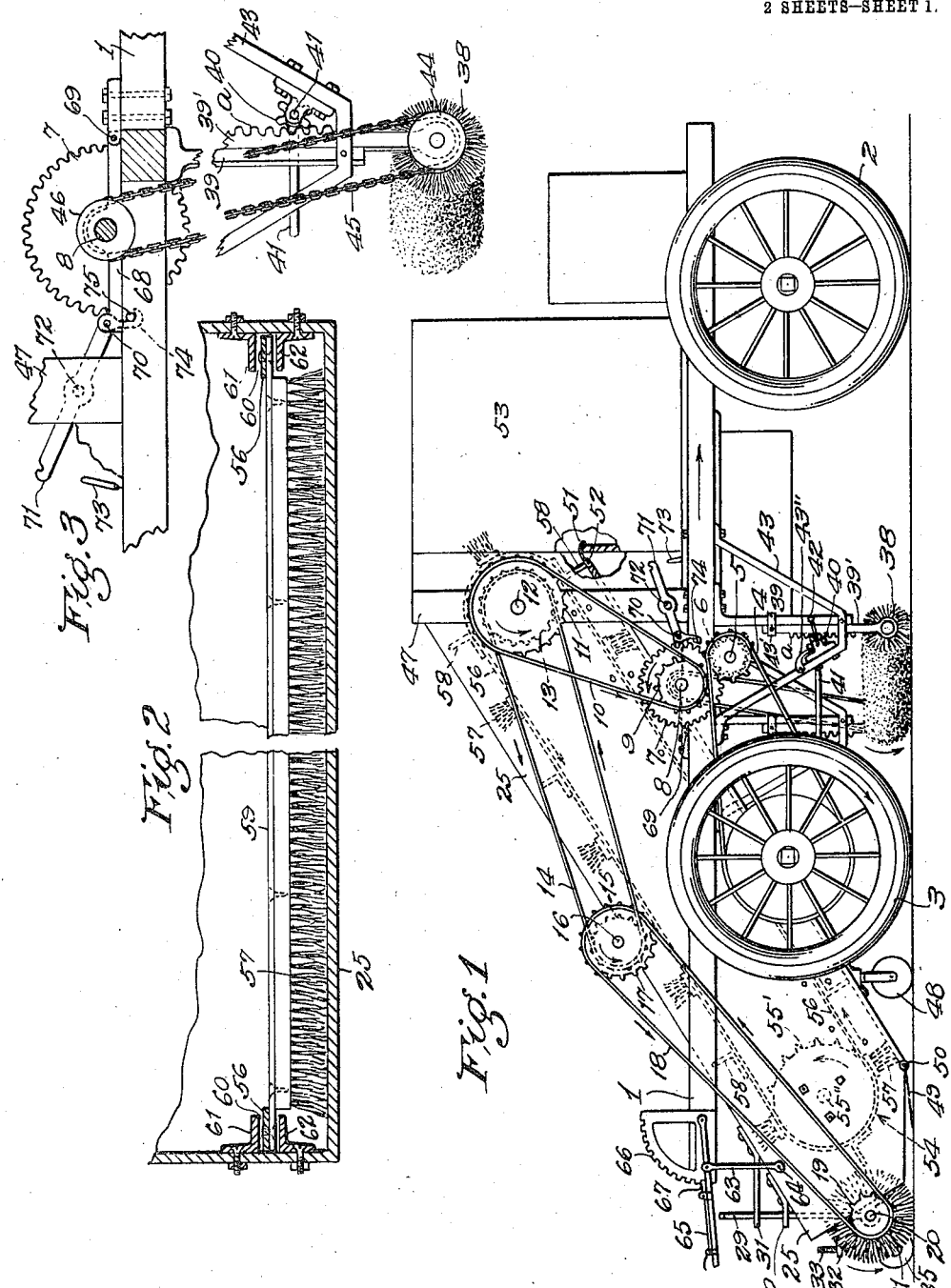

UNITED STATES PATENT OFFICE.

DAVID GAUL, OF LOS ANGELES, CALIFORNIA.

AUTOMOBILE STREET-CLEANER.

1,072,713.

Specification of Letters Patent. Patented Sept. 9, 1913.

Application filed March 11, 1912. Serial No. 683,111.

*To all whom it may concern:*

Be it known that I, DAVID GAUL, a citizen of the United States, residing at Los Angeles, in the county of Los Angeles and State of California, have invented a new and useful Automobile Street-Cleaner, of which the following is a specification.

An object of the invention is to provide means whereby refuse may be at the same time loaded and carted away from a street with a minimum amount of hand labor.

Various subsidiary objects may appear from the subjoined detail description.

The invention may be carried out in various forms.

The accompanying drawings illustrate the invention in its preferred form.

Figure 1 is a side elevation of an automobile street-cleaner constructed in accordance with this invention. Fig. 2 is an enlarged broken sectional detail in elevation from line $x^2$, Fig. 5. Fig. 3 is an enlarged fragmentary detail of some of the parts in Fig. 1. Fig. 4 is a rear elevation from the left of Fig. 1. Fig. 5 is an enlarged fragmental sectional elevation on line $x^6$ Fig. 4 illustrating the adjustable brush and the lower rear end of the elevator. Fig. 6 is an enlarged fragmental detail on line $x^7$, Fig. 5 of the adjustable brush support.

Arrows on the section lines of the different views indicate the direction of sight.

It is understood that the usual automobile driving and steering apparatus is employed and illustration of the steering apparatus is omitted to avoid confusion of the lines.

To simplify the drawings, the chains are shown taut.

The automobile chassis or body 1 is in the form of a horizontal rectangular frame and is carried by any usual means, not shown, on the usual front and rear wheels 2, 3; the rear driving wheels 3 being connected by driving connections 4 with a shaft 5, which is provided with a pinion 6 meshing with a reversing spur wheel 7 mounted on a reversing shaft 8 that is provided with a sprocket wheel 9 connected by a sprocket chain 10 and sprocket wheel 11 with a main line shaft 12 having a sprocket 13 connected by a driving chain 14 with a sprocket 15 which is mounted on a brush line shaft 16 that extends across the frame and is provided with two sprockets 17 which are arranged one on either side of the body 1 and which are connected to chains 18 led around sprockets 19 on shafts 20 of main rotary brushes 21 of which there are preferably two. The engine shaft 5 and reversing shaft 8 are journaled on the frame 1.

The outer ends of the brush shafts 20 are journaled in boxes 22 which are slotted at 23 to receive bolts 24 by which they are adjustably connected to the sides of a conveyer chute 25 in order that the rotary brushes may be moved toward and from the street surface to compensate for wear of the brushes.

The inner adjacent ends of the brush shafts 20 are slidably mounted relative to the frame 1 and are adjustably mounted relative to the street surface by suitable means. In the drawings the brush shafts 20 are provided at their inner adjacent ends with journals 26 having convex opposing rocker faces 27 and preferably provided with an anti-friction journal box 28 which as shown to an exaggerated degree is sufficiently cut away around the journals to avoid binding.

The journal box 28 is slidably mounted relative to the frame 1 by a cylindrical post 29 and guides 30, 31 in the form of superposed eye-bars which are bolted to the top of the chute 25, and the journal box 28 is further provided with a bracket 32 that is perforated to receive the threaded stem 33 of a forked head 34 which journals a brush supporting wheel 35.

The stem 33 is provided above and below the bracket with washers and nuts 36, 37 to adjustably hold the stem in order that the inner ends of the rotary brushes 21 may be moved toward and from the street surface and the post 29 is perforated in several places at its upper portion to receive a stop 33′ in the form of a pin, projecting at right angles from the stem so as to limit downward movement of the stem and consequently of the inner ends of the main brushes 21.

The shiftable mounting of the inner ends of the main brushes 21 as set forth compensates for differences in the direction of slope of street surfaces, as are found, for instance, on opposite sides of the crown of a street and permits self-alining of the brushes to such irregular surfaces.

A rotary curb brush 38 is provided on one side of the median line of the machine for the purpose of brushing material from the gutter into the path of the main brushes 21, and such curb brush is preferably arranged with its outer end in advance of its inner end.

The curb brush 38 is journaled at its ends in complementary hangers which are each preferably formed of two relatively slidable members 39, 39', the member 39 being bolted to the frame. The hanger journal members 39' are provided along their rear edges with racks *a* to mesh with pinions 40 which are fixed to a shaft 41 that is provided on its outer end with a handle 42 and that is journaled to braces 43 which are bolted beneath the frame 1.

The hanger members 39 are fastened at their lower ends to the braces 43 which act as keepers for the hanger journal members 39' that are provided at their upper ends with sleeves 43' which are slidably mounted on the hanger arms 39.

By turning the handle 42 in the appropriate direction the curb brush 38 may be moved toward and from the street surface and may be held in the position of adjustment by means of dogs 43" which engage the pinions 40 and are pivoted to the braces 43.

The curb brush 38 is provided at its inner journal end with a chain sheave 44 which is driven by a chain 45 led around a chain sheave 46 that is mounted on the reversing shaft 8.

The conveyer chute 25 is pivotally mounted at its front end on the main line shaft 12 between a pair of standards 47 which are mounted on the frame 1 and journal the main line shaft; and the rear end of the conveyer chute is held free from the street surface by chute supporting wheels 48. The rear edge of the floor of the conveyer chute 25 is provided from side to side with an apron 49 which is pivotally connected at 50 to the chute so that it will close the space between the rear end of the chute and the street surface. The front edge of the floor of the conveyer chute 25 is provided from side to side with an apron 51 which is pivotally connected at 52 to the chute and projects over the edge of the rear wall of a receiver 53 that may be in the form of a rectangular box which normally rests at its rear against the standards 47 that accommodate between them the front end of a combined brush and scraper conveyer 54.

The main line shaft 12 is provided inside of the conveyer chute 25 with sprocket wheels 55 to receive and drive the endless conveyer chains 56 which are trained around idler sprocket wheels 55' that are independently journaled at 55" near the rear end of the chute and adjacent the main rotary brushes 21. By this construction the lower end of the chute is unobstructed from side to side so as to readily admit the sweepings from the main brushes 21.

The conveyer chains 56 are provided alternately at intervals with brushes 57 and angle-iron scrapers 58 that extend from side to side of and contact with the floor of the chute; and are adapted to move any material deposited on the rear chute apron 49 into the chute 25.

The main brushes 57 are each provided with guides which may be formed by the projecting ends of a plate 59 that is fastened along the top of the brush, said plate ends being accommodated in ways 60 which are formed along both sides of the chute 25 by parallel upper and lower angle-irons 61, 62, that are spaced apart and riveted from end to end of the chute and preferably have their rear ends flared away from one another so as to readily admit the brush guides to the ways 60 without binding. One leg of each of the scrapers 58 may be extended at either end to also form guides similar to those formed by plate 59, and similarly adapted to slide in the ways 60.

The purpose of the guides and ways is to keep the conveyer brushes flat against the chute floor and also to prevent the scrapers from being turned and forced away from the chute floor by the weight of the material and furthermore act to prevent vibration and jumping of the chain and its attachments.

The rear end of the conveyer chute 25 may be adjusted toward and from the street surface and may be held in the adjusted position by suitable means. In the drawings the sides of the rear ends of the chute 25 are provided with links 63 pivoted at 64 to the chute and pivoted to adjusting levers 65 which are pivoted to and work on quadrants 66 and which are provided with latches 67 to engage the quadrants and hold the levers 65 in adjusted position.

The reversing shaft 8 is preferably journaled in movable relation to the frame so that when the rear end of the conveyer chute 25 is raised the gears 6 and 7 may be moved away from one another farther than such raising of the chute would effect in order that the gears may be thrown completely out of mesh. For this purpose the journal box 68 of the reversing shaft 8 is hinged at 69 on the frame 1 and is pivoted at 70 to a hand lever 71 which is fulcrumed at 72 to one of the standards 47 and when operated to throw the gear 7 out of commission the lever may be held by a link 73 fastened to the frame 1.

The journal box 68 may be secured against movement when the gear wheels 6, 7 are in mesh by a hook 74 which is pivoted at 70 to the journal box and may be thrown into engagement with a pin 75 that projects from the frame 1.

In practical operation the main and curb rotary brushes 21, 38, being correctly adjusted, the street cleaner will be driven forward in the direction of the large arrow by an automobile engine or other suitable means, and power will be applied through the driving connections to drive main and curb rotary brushes 21, 38 reversely to the driving wheels 3 in the direction of the arrows adjacent the brushes, and the power so applied will also drive the conveyer 25 in the direction of the arrow all as in Fig. 1.

The curb brush 38 will sweep the gutter free of material and deposit it in the path of the main brushes 21 which will sweep the material onto the rear chute apron 49 from whence it is removed by the conveyer brushes 57 and scrapers 58 to the chute and thence into the receiver 53, the scraper, as is obvious, moving the coarser material which tends to escape from the brushes and the brushes moving the finer material which tends to escape from the scrapers.

When the street cleaner is operating along the middle or crown of the street, the machine is guided to bring the brush supporting wheel 35 at the crest or middle of the crown and the main rotary brushes 21 will then independently adjust themselves to the reverse slopes of the street surface, thus thoroughly sweeping such portions.

When it is desired to empty the receiver 53, the front chute apron 51 may be swung up and backward and the receiver may then be moved to one side of the frame and tilted to discharge the contents.

When the sweeping operation is not desired, the lower end of the chute together with the main rotary brushes may be raised out of operating position by raising the levers 65 and the gear wheels 6, 7 may be thrown out of mesh with one another by depressing the lever 71, and the curb brush 38 may also be raised from contact with the street surface by operating the handle 42.

I claim:—

1. In a street cleaner, the combination with the frame, of a conveyer chute pivotally mounted at its front end on the frame, rotary brushes journaled on the rear end of and in slidable relation to the conveyer chute, a wheel to adjustably support the inner ends of the brushes, and means to support the rear end of the chute.

2. In a street cleaner, the combination with the frame, of a chute mounted on the frame, shafts adjustably journaled at their outer ends on the frame, a journal box at the inner ends of the shafts and having a sliding connection with the chute, a bracket connected to said journal box, a wheel adjustably mounted on the bracket, and brushes mounted on the shafts for the purpose set forth.

3. In a street cleaner, the combination with the frame, of a chute mounted on the frame, shafts adjustably journaled at their outer ends on the frame and having convex inner ends, a journal box at the inner ends of the shafts and having a sliding connection with the chute, a bracket connected to said journal box, a wheel adjustably mounted on the bracket, and brushes mounted on the shafts for the purpose set forth.

In testimony whereof I have hereunto set my hand at Los Angeles, California, this 2d day of March, 1912.

DAVID GAUL.

In presence of—
 JAMES R. TOWNSEND,
 L. BELLE RICE.